Aug. 14, 1956     T. FRANKEL     2,759,053
DIAL SPEED AND RATIO TEST CIRCUIT
Filed July 26, 1952
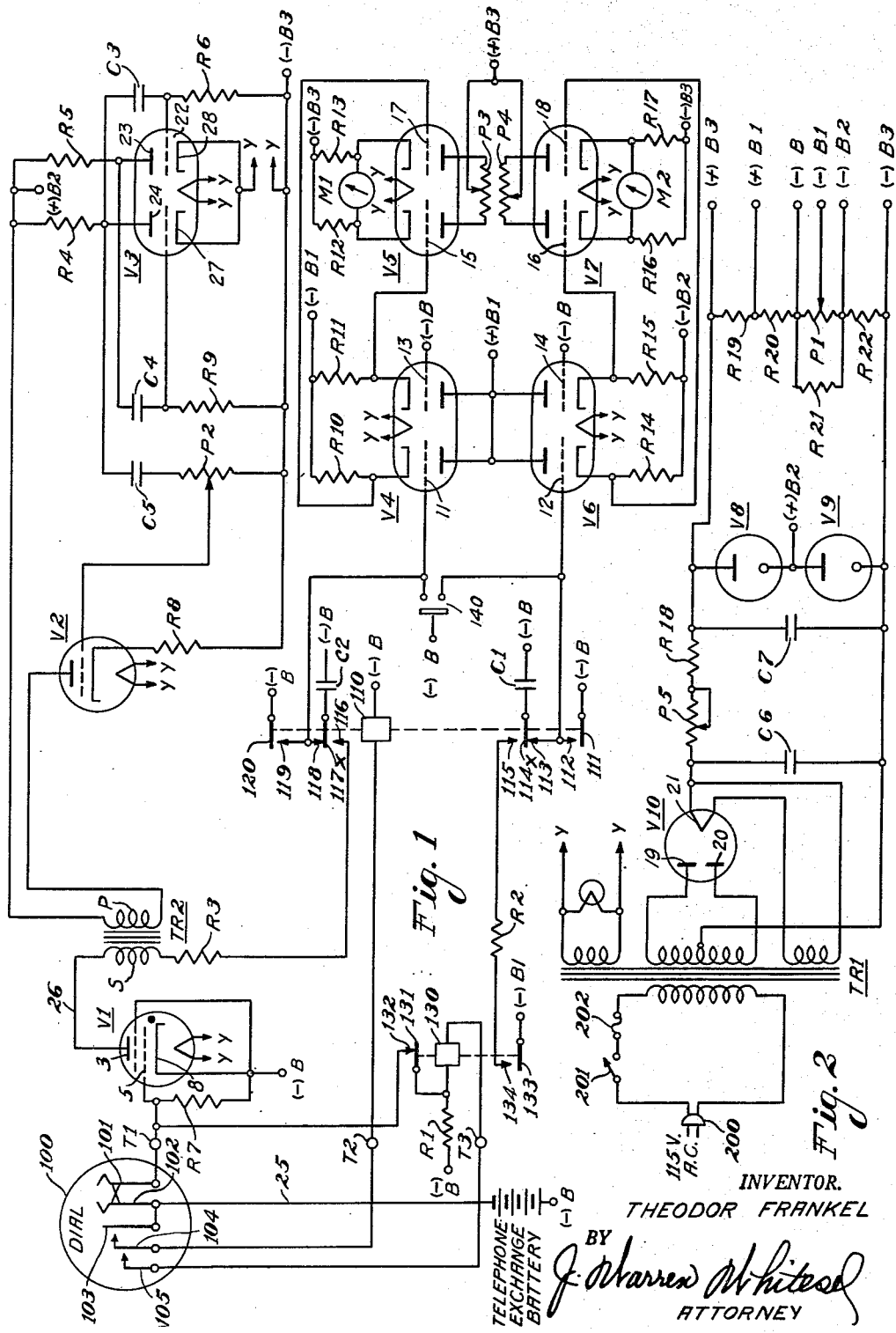
INVENTOR.
THEODOR FRANKEL
BY
J. Warren Whitesel
ATTORNEY

United States Patent Office 2,759,053
Patented Aug. 14, 1956

2,759,053
DIAL SPEED AND RATIO TEST CIRCUIT

Theodor Frankel, Rochester, N. Y., assignor, by mesne assignments, to General Dynamics Corporation, a corporation of Delaware Application July 26, 1952, Serial No. 301,091

13 Claims. (Cl. 179—175.2)

This invention relates to apparatus for testing the speed and ratio of cyclically recurring pulses. More particularly, this invention is useful for testing a telephone pulse sending device, such as a dial, for example.

Certain electrical equipment is conventionally designed to be controlled by D. C. pulses. For example, an automatic telephone system is arranged to count the number of impulses in each of various sequentially occurring pulse trains. The information derived from this counting process is then utilized for the purpose of completing a connection from a calling point to a desired called point. Almost any manufactured article must operate within fixed limits of design tolerance. For example, in the case of pulse controlled machinery the design tolerance requires the pulses to have certain characteristics if those pulses are to be effective. That is, the pulses must recur cyclically at a certain speed; furthermore, the make-break portions of the pulse cycle (or stated otherwise, the off and on periods) must be in a certain ratio with respect to each other.

In the past, many schemes have been developed for testing the speed and ratio of pulse transmitting devices such as those which might be suitable for developing impulses of the type used in automatic telephony. Most of these test devices are complicated arrangements which involve switching equipment of expensive design. Furthermore, the testing device very often is built around a capacitor charging scheme which presents the very substantial problem of how best to read the charge stored on the capacitor. This problem usually is further aggravated by the fact that various leakage paths, such as the charging circuit and the reading circuit, for example, tend to prevent a leisurely reading such as is required to insure accurate measurements.

Testing devices of this type also may be designed around gas-filled tubes; however, such tubes have known disadvantages. For example, a grid or control electrode arrangement may determine when the tube fires; however, once the tube is fired, the grid loses all control over the plate current.

One object of this invention is to provide an improved means for testing the characteristics of control pulses.

Another object of this invention is to provide a speed and ratio testing device of new and unusual design.

Still another object of the invention is to provide a speed and ratio measuring device in which the capacitor charging circuit is isolated from the device under test.

A further object of this invention is to provide a capacitor charging and measuring scheme in which the charge built on the capacitor may be read at leisure.

A still further object is to provide a gas-filled tube controlled capacitor charging scheme in which a control is retained over the plate current independent of the control electrode.

Yet another object of this invention is to provide a gas-filled tube circuit in which the plate current is controlled independently of the conductive threshold of the tube.

Briefly, this invention is shown in connection with a typical telephone dial which is provided with both impulsing springs and off-normal springs. The impulsing contacts produce digit pulses according to the number dialed. For example, if the digit zero is dialed, ten pulses are transmitted, while if the digit one is dialed, one pulse is transmitted. In like manner, the dialing of any other digit transmits a corresponding series of pulses. In accordance with the present invention the off-normal springs are used to control two relays. One of these relays is adapted to mark the beginning and the end of a dial controlled pulse train while the other relay is used to connect two capacitors to be charged. The first capacitor is arranged to be charged during the break period of each impulse while the other capacitor is charged continuously as a function of the time during which the entire digit pulse train is being transmitted to the test equipment shown.

A gas-filled tube is provided with a negative bias which is controlled by the dial impulse springs to render the tube normally non-conductive. This tube is arranged to charge the first capacitor during the break period when the impulse springs are open thereby removing the negative bias. The plate supply for this tube is derived from a suitable alternating current; the principle being used is that a gas-filled tube conducts only when the plate is positive with respect to the cathode. Since the plate is alternately driven from positive to negative, it will be seen that the tube is alternately turned off and on to sample the open or closed condition of the dial springs under test so that in effect during each on-portion a test is made to determine whether the dial impulse springs are still open. If these springs are open there is no negative bias; hence the first capacitor is charged. On the other hand, if the dial springs are closed, the charging circuit for the capacitor is rendered ineffective because the dial impulse springs again render the tube non-conductive due to a negative bias on the control electrode.

Other objects will be apparent from the following specification and the accompanying drawings.

Fig. 1 shows a test circuit for measuring the speed and ratio of electrical impulses.

Fig. 2 shows a power supply circuit which is suitable for furnishing the various voltages required for the desired operation of the circuit components of Fig. 1.

Referring briefly to Fig. 1, there is shown a speed and ratio test circuit. The impulsing device 100 to be tested, such as a telephone dial, for example, is provided with impulse springs 101 and 102 which open and close on each individual pulse in a pulse train. For example, if the digit 0 is dialed, springs 101 and 102 open and close ten times. Dial 100 is also provided with off-normal springs 103, 104 and 105 which remain closed from the time the dial is first pulled off-normal until it returns to normal, i. e., throughout the entire pulsing until the dial comes to rest at the end of the last pulse in the series comprising each digit.

Relays 110 and 130 are controlled by these dial off-normal springs. Relay 110 operates when dial 100 is first moved off normal; however, relay 130 is provided with a shunt circuit through armature 131 to delay its operation until the transmission of the first digit pulse. This relay then will be operated for a period which is a measure of the total time elapse during the transmission of the digit train of impulses. A circuit is now closed to store an electrical quantity upon an integrating reactance, such as a charge which is stored on capacitor C1 for example, by way of suitable control means, which in this case comprises relays 110 and 130. At the end of the dial pulses, off-normal springs 103—105 are opened to break the holding circuit leading to control relays 110 and 130; hence it is seen that capacitor C1 is charged continuously over the period of time marked by the beginning and end of the digit pulse train. This charge then is a measure of the dial speed since a fast dial produces pulses of a more rapid reoccurrence, thus causing a smaller charge on capacitor C1, while a slow dial produces pulses of a less rapid reoccurrence leaving a larger charge on capacitor C1.

The ratio test (i. e., ratio of make to break time of contacts 101 and 102) is controlled by the upper contacts of relay 110. When operated, armature 117 makes with contact 116 thereby completing a circuit extending between another integrating reactance, shown as capacitor C2, and the plate of tube V1. Grid 5 of this tube is normally provided with a negative bias controlled by the dial impulse springs which prevents the tube from firing; however, when impulse springs 101 and 101 are open, this negative bias is removed, causing the tube to fire and permitting plate current to flow through resistance R3 to charge capacitor C2. The plate supply is an A. C. current, preferably of approximately 2000 cycles per second in the example given of a telephone dial, operating alternately to drive plate 3 of tube V1 positive and negative.

Thus, it will be seen that the integrating reactance, capacitor C2, repeatedly receives an incremental charge, but only during the positive half cycle portions impressed upon plate 3. This permits a cyclically recurring test to determine whether impulse springs 102 and 101 are opened. If they are open, tube V1 again conducts when next the plate is driven positive to store an incremental charge on capacitor C2. If, on the other hand, springs 101 and 102 have closed, negative bias again is placed on grid 5 to bias tube V1 beyond its conductive characteristics so that the charging of capacitor C2 ceases. Capacitor C2 receives a similar charge each time springs 101 and 102 are opened on succeeding pulse break periods. Since the charge on capacitor C2 is built progressively during each break period, the total charge is an indication of the relation between the break time and the total time. Since the total time is known, a meter may be calibrated to read the make-to-break ratio.

It is thought that the invention will be more clearly understood by a detailed description of the accompanying drawing.

When it becomes necessary to test a pulse transmitting device, such as a telephone dial or key sender, or the like, for example, a test man may connect the pulsing device to the test circuit shown by any suitable means, such as by terminal contacts T1, T2 and T3, for example.

The person conducting the test now inserts his finger into any desired dial hole and rotates the dial to the conventional finger stop winding the driving spring in the process. For the sake of clarity in description, it will be assumed that the digit dialed is zero, although practically any digit may be used. This initial rotation of the dial closes off-normal springs 103, 104 and 105, thereby completing a circuit for energizing relay 110. This circuit may be traced from (—)B through the winding of relay 110 to the terminal T2, closed off-normal springs 104 and 103, impulsing spring 102, and conductor 25 to the (—) side of the telephone exchange battery, the (+) side of the exchange battery being connected to (—)B. Relay 110 operates to attract its various armatures. Armature 111 makes with contact 112 to connect (—)B to grid 12 of vacuum tube V6. Armature 114 prepares a charging circuit for capacitor C1 at contact 115 while armature 117 prepares a charging circuit for capacitor C2 at contact 116. Armature 120 connects (—)B to grid 11 of vacuum tube V4. A circuit is also completed at the initial closure of dial off-normal springs for relay 130; however, this relay does not operate at this time since a shunt circuit extends from the left side of relay 130, through armature 131 and contact 132, terminal T1, impulse springs 101 and 102, off-normal springs 103, 104 and 105, terminal T3, through the winding of relay 130, and back to the right side of relay 130.

The test man releases the dial whereupon it returns to normal in a conventional manner under influence of a driving spring which was previously wound during the initial off-normal movement. The impulse springs 101 and 102 are opened and closed alternately to transmit ten pulses, each of which is comprised of a make and a break period. On the first impulse, springs 101 and 102 are opened whereupon the shunt circuit is removed from relay 130 allowing it to operate over a circuit which may be traced from (—)B through resistance R1, the winding of relay 130, terminal T3, off-normal contacts 105, 104 and 103, conductor 25 to the (—) side of the telephone exchange battery. Relay 130 attracts its armature 131, thereby opening another point in the shunt path around its windings so that it will be held operated throughout the entire ten pulses and until the dial has returned completely to normal, thereby opening off-normal springs. Relay 130 also attracts armature 133 to complete a charging circuit for capacitor C1. This circuit may be traced from (—)B1 over armature 133, contact 134, resistance R2, contact 115, operated armature 114, and capacitor C1, to (—)B. When the dial returns to normal and springs 103, 104 and 105 are opened, relays 110 and 130 are released. Armature 131 makes with contact 132 to re-establish the shunt circuit. Armature 133 is released to break the charging circuit for capacitor C1. Thus, it is seen that the charge resulting on capacitor C1 is a function of the time during which the entire train of digit impulses was transmitted; hence, the charge is a direct result of the dial speed. A slow dial would cause relay 130 to be operated for a longer period of time thus charging capacitor C1 for a longer period and therefore to a higher voltage, while a fast dial would cause relay 130 to be operated for a shorter period of time leaving a lower charge on capacitor C1.

Returning to the time when impulse springs 101 and 102 were closed, just prior to the release of the dial, tube V1 is held cut-off by a negative grid bias which is sufficient to prevent any plate current flow. This negative bias circuit may be traced from exchange battery over conductor 25, closed impulse springs 102 and 101, and terminal T1 to grid 5 of gas tube V1, and through resistance R7 to cathode 8 and (—)B. When impulse springs 101 and 102 are opened to transmit the break period of the first impulse, a circuit is completed to charge capacitor C2; that is, the negative bias is removed when the impulse springs are opened, thus permitting a current to flow between cathode 8 to plate 3 of gas tube V1 and over conductor 26 to secondary winding S of transformer TR2, resistance R3, contact 116, armature 117 and capacitor C2 to (—)B.

Means is provided for switching the testing means off and on at a high rate of speed as compared with the cyclic rate at which the impulses recur. This switching means comprises any suitable source of alternating current and means for connecting the alternating current output of that source to furnish the anode supply potential to the gas-filled tube, that is, alternating current is used as the plate supply for gas tube V1. This form of plate supply is necessary since gas tubes of this type are arranged to become conductive at one control potential and then to continue to be conductive even after the control potential is reduced below the tube's striking or firing point. More in detail, in the preferred embodiment of this invention, dealing with the testing of a telephone dial, a 2000 cycle voltage is derived from multivibrator V3 and is applied through winding P of transformer TR2 alternately to drive plate 3 of gas tube V1 positive and negative. It is obvious that any other suitable source of alternating current may be used such as the filtered output of an oscillator, mechanical generator or the like. On each positive half-cycle, current flows to charge capacitor C2 while the tube is rendered non-conductive on each negative half-cycle. When digit springs 101 and 102 close at the end of the break period marking the first impulse, the negative bias is again placed on grid 5 of gas tube V1 to prevent this tube from becoming conductive when next plate 3 is made positive by the plate supply. Stated another way, gas-filled tube V1 alternately is turned off and on at a rate of 2000 times per second. Each time it is turned on, it tests to determine whether the impulse contacts are still open. If they are, capacitor C2 is charged briefly during tube V1's "on" period. If the impulse contacts are closed, capacitor C2 receives no further charge.

The frequency of 2000 C. P. S. has been selected as a plate supply to obtain the accuracy usually required for a telephone dial. If a higher accuracy is required, a plate supply of higher frequency should be used. That is, the inherent inaccuracy of this system is of the order of ½ cycle of the plate supply, e. g., in testing a telephone dial, 2000 C. P. S. is used since the maximum error which may be introduced by my testing system is up to one millisecond. Since the total times to be measured are one thousand milliseconds for dial speed and approximately 620 milliseconds for ratio, the error introduced will be less than ½ or 1%.

The output of multivibrator V3 is connected by way of capacitor C5 and potentiometer P2 to a single stage amplifier tube V2. Potentiometer P2 may be adjusted to control the potential transferred at transformer TR2 and hence the plate voltage of tube V1.

During the dial pulsing, capacitor C2 is charged each time springs 101 and 102 are open. Thus, a cumulative charge is built on capacitor C2 as an indication of the total time of the ten break periods. Therefore, this charge is an indication of the make-break ratio.

At the end of the tenth pulse, dial 100 returns to normal, opening off-normal springs 103, 104 and 105 and thereby releasing relays 110 and 130. As explained before, relay 130 releases armatures 133 thereby breaking the charging circuit of capacitor C1. Relay 110 releases armatures 111, 114, 117 and 120. The potential (—)B is now removed from grids 11 and 12 of vacuum tubes V4 and V6. Armature 114 connects capacitor C1 to grid 12 of vacuum tube V6 and armature 117 transfers the voltage to which capacitor C2 has been charged to grid 11 of tube V4. Armatures 117 and 114 are "X" contacts which make before and break after the armatures which are not marked by an "X." This is to prevent an accidental discharge of the capacitors C1 or C2 which might otherwise occur if (—)B were still connected at armatures 111 and 120 after armatures 117 and 114 have released. Grids 13 and 14 of tubes V4 and V6 are connected to (—)B; hence, each of the tubes is unbalanced by the charge on the various capacitors and a plate current flows to the extent of the charges built on the two capacitors. The voltage drop across resistances R11 and R15 which are connected to the right-hand cathode of each of the tubes is connected to grids 15 and 16 of tubes V5 and V7, respectively, while the voltage drop across resistances R10 and R14 is placed on grids 17 and 18 of tubes V5 and V7, respectively.

Means is provided for visually presenting an indication of the charge on capacitors C1 and C2. For this purpose, meters M1 and M2 are connected between the cathodes of tubes V5 and V7, respectively. Tubes V5 and V7 are unbalanced so that a current flow may be read in meters M1 and M2, respectively, the current being proportional to the charges built on capacitors C1 and C2, respectively. Thus, meter M1 reads the charge built on capacitor C2 and hence represents a summation of the time elapsed during all of the break periods when impulse springs 101 and 102 were opened between each of the dial pulses. The scale of meter M1 may be calibrated to give a reading either in time units or in the percentage of the ratio of the make-to-break period. The current through meter M2 is proportional to the charge which was built on capacitor C1 during the total impulsing time; hence, this meter may be calibrated to read the dial speed either in time units or pulses per second.

After the various meter readings are taken, the reset key 140 is operated, thereby connecting (—)B to capacitors C1 and C2 by way of contact 113 and armature 114 and by way of contact 118 and armature 117, respectively. This discharges each of the capacitors so that they will be ready for the next test. The reset key 140 together with potentiometers P3 and P4 also are used for the initial balance of tubes V5 and V7. That is, the reset key is operated and each of the potentiometers P3 and P4 is adjusted so that each meter, M1 and M2, reads zero.

Fig. 2 shows a power supply which is suitable for use in connection with the test device of Fig. 1. Supply plug 200 is connected with any suitable A. C. source of 60 cycle 115 volts, and switch 201 is closed to complete a circuit for energizing transformer TR1 by way of fuse 202. The 6.3 volt secondary winding of transformer TR1 may be connected with all terminals in Fig. 1 which are marked by a "Y," the 350-volt secondary windings are connected with plates 19 and 20 of rectifier tube V10; and the 5-volt secondary winding is used to energize heater element 21 of tube V10. Gas tubes V8 and V9 are used to regulate the output of rectifier V10 while potentiometer P1, together with the various voltage tap connections, are used to provide desired potentials. These potentials may be connected at suitable places in Fig. 1 as indicated. That is to say, connection (—) B1 may be connected to armature 133 of Fig. 1, and cathodes of tube V4. In like manner, any of the other terminals may be connected with any desired terminal in Fig. 1 as indicated.

Returning to the description of Fig. 1, the power source for the plate supply of tube V1 is illustrated as a free running multivibrator V3 which is driven from a 60 cycle source. That is, tube V3 may be considered as two tubes, each having a plate, a cathode and a grid. The circuits for each half of the tube are alike; however, a perfect balance is almost impossible. There will be some slight difference in the balance; hence one side starts to conduct more heavily and there is a cumulative unbalance. For example, assume that the left side of tube V3 is conducting heaviest. This increase in current causes a voltage drop across resistance R4. This lowers the potential on capacitor C3 and in turn the potential on grid 22 to decrease the current at plate 23. Thus, each increase in current at plate 24 cuts down the current at plate 23. The plate current in the left side of tube V3 soon reaches a maximum, while the plate current in the right side is reduced to almost zero. At this time capacitor C3 is fully charged. However, capacitor C3 starts to discharge through resistance R6. As soon as the charge on capacitor C3 is sufficiently reduced, the flow of plate current on the right side of tube V3 is resumed and capacitor C4 is charged to cut-off the left side. This process is cyclically repeated; that is, the two sides of tube V3 are turned off and on cyclically at a rate determined by the time constants of capacitor C3 and resistance R6 as well as capacitor C4 and resistance R9. The plate load resistors R4 and R5 as well as the plate voltage also have an effect upon the frequency at which multivibrator V3 is running.

One inherent difficulty with such free running multivibrators is that their frequency stability is poor; therefore, it is necessary to provide some sort of a synchronizing device. Fig. 1 shows the cathodes 27 and 28 of tube V3 as connected together with a common point connected to the 6.3 volt winding of Fig. 2 by way of the "Y" terminals. Since plug 200 of Fig. 2 is connected to a 115-volt 60 cycle source, the voltage across the "Y" terminals is alternating at 60 cycles per second. Hence, the multivibrator is arranged to be synchronized by the 60 C. P. S. powerline frequency. That is, the cathodes are alternately driven positive and negative thereby forcing the switching action to take place slightly in advance of its normal cycle and at a steady rate determined by the power source to which plug 200 is connected.

This device has been built, tested, and found to operate satisfactorily when the various components had the values given in the table below. It should be understood, however, that these values are by way of example only and that many other components could be used also.

Capacitors:
- C1 — 1 mf., 1000 v.
- C2 — 1 mf., 1000 v.
- C3 — .003 mf., 600 v.
- C4 — .003 mf., 600 v.
- C5 — .01 mf., 600 v.
- C6 — 20 mf., 450 v.
- C7 — 40 mf., 450 v.

Potentiometers:
- P1 — 10 K, 2 w.
- P2 — 1 M, ½ w.
- P3 — 3 K, 4 w.
- P4 — 3 K, 4 w.
- P5 — 3 K, 10 w.

Resistors
- R1 — 680 ohms, 5 w.
- R2 — 5.6 M, ½ w.
- R3 — 2.2 M, ½ w.
- R4 — 22 K, 1 w.
- R5 — 22 K, 1 w.
- R6 — 47 K, ½ w.
- R7 — 82 K, ½ w
- R8 — 1.5 K, ½ w.
- R9 — 47 K, ½ w.
- R10 — 5.6 M, ½ w.
- R11 — 5.6 M, ½ w.
- R12 — 60 K, 2 w.
- R13 — 60 K, 2 w.
- R14 — 5.6 M, ½ w.
- R15 — 5.6 M, ½ w.
- R16 — 60 K, 2 w.
- R17 — 60 K, 2 w.
- R18 — 2 K, 10 w.
- R19 — 60 K, 2 w.
- R20 — 6 K, 2 w.
- R21 — 15 K, 2 w.
- R22 — 60 K, 2 w.

Tubes:
- V1 — 2050
- V2 — 6SN7
- V3 — 6SN7
- V4 — 6SN7
- V5 — 6SN7
- V6 — 6SN7
- V7 — 6SN7
- V8 — VR105
- V9 — VR150
- V10 — 5Y3

K = × 1000 ohms
M = × 1,000,000 ohms

The field of applicability of my invention referred to above, namely, automatic telephone sytems, is but one of many. It should be obvious that the same conditions would hold true with other types of pulse controlled equipment. Furthermore, this invention is adapted to indicate the characteristics of electrical impulses which may be derived from any suitable source such as, a telephone dial, relay contacts, a key sender or any of many other devices. For the sake of simplicity in explanation, the drawing shows a telephone dial and the specification describes the device under test as a "dial"; however, it should be understood that any other suitable device may be substituted therefor. Therefore, it is my intention to cover the device shown as well as such obvious modifications in the appended claims.

What I claim is:

1. An impulse testing device comprising; a source of cyclically recurring impulses, testing means comprising a gas-filled discharge device having at least an anode, means comprising a source of alternating current, means for connecting said alternating current to furnish the anode supply to said gas-filled tube for switching said testing means off and on at a high rate of speed as compared with the cyclic rate at which said impulses recur, and means utilizing said testing means for testing during each of said on periods to determine whether said impulse source is producing an impulse.

2. In a dial testing system, a telephone dial having impulse springs and off-normal springs, said impulse springs being operative to transmit pulses of electrical current at a first frequency, testing means, means for causing said testing means to indicate either of two conditions depending upon whether said impulse springs are or are not transmitting a pulse of said electrical current, switching means, and means controlled by said switching means for causing said testing means to sample at a relatively high frequency with respect to said first frequency to determine whether said impulsing springs are transmitting electrical current.

3. In the device of claim 2, a first integrating reactance means, and a first control means operated under the influence of said dial springs for connecting said reactance means with said testing means.

4. In the device of claim 3, a second control means operated under the influence of said dial springs, a second integrating reactance means, and means for controlling said second reactance means under the joint influence of said first control means and said second control means.

5. The device of claim 4 and indicating means connected to said first and said second integrating reactances, respectively, for indicating the values stored by said reactances.

6. The device of claim 5 in which each of said integrating reactances is a capacitor; said testing means comprises a gas-filled discharge device having at least a grid and an anode; said means for indicating said two conditions comprising said grid, a source of negative bias, and means including said impulse springs for connecting said source of negative bias to said grid; said switching means comprising a free-running multivibrator; and said means controlled by said switching means for causing said testing means to sample comprising circuit means for connecting the output of said multivibrator to the anode of said gas-filled discharge device.

7. The device of claim 6 in which said first control means is a relay operated by said off-normal springs and said second control means is a relay operated jointly by said impulse springs and said off-normal springs, whereby said first capacitor reactance receives an incremental charge when said impulse springs indicates a first of said two conditions and said switching means samples simultaneously therewith, and whereby said second capacitor reactance receives a continuously charging current while said impulse springs are transmitting impulses and said off-normal springs are operated.

8. In a telephone dial testing system of the type in which a plurality of capacitors is charged, one capacitor is being charged as a function of the dial speed and another capacitor being charged as a function of the ratio of make-to-break portions of the impulse cycle of said telephone dial, the combination comprising; a source of cyclically recurring impulses, testing means, means for switching said testing means off and on at a high frequency, and means in said testing means effective when said testing means is switched on for determining the presence of said impulses.

9. In a device for testing a telephone dial including impulsing contacts having open and closed periods, means for testing the ratio of said open and closed periods comprising means which repeatedly tests at a high rate as compared to said periods to determine whether said impulsing contacts are open, an integrating device connected to said test means, and means for storing an increment of an electrical quantity in said integrating means each time said testing means determines that said impulse contacts are open.

10. The device of claim 9 and means for testing the speed of said dial comprising a second integrating circuit which is rendered effective throughout impulsing of said telephone dial.

11. A gas tube control circuit comprising; a gas tube having at least an anode, a cathode and a grid, means for applying a first voltage to said cathode, means for applying a second voltage to said anode, said second voltage being alternately positive and negative with respect to said first voltage, means for intermittently applying a voltage to said grid, said second voltage alternating at a high frequency with respect to the intermittent applications of said voltage applied to said grid whereby said gas tube is turned off and on by said second voltage and the discharge current of said tube during each on-period is a function of the speed and ratio of said pulsing contacts, and means for storing information each time that said gas tube is turned on when said voltage is applied to said grid.

12. The device of claim 11 and a multivibrator, said second voltage being the output of said multivibrator.

13. The device of claim 12 in which said multivibrator is free-running at 2000 cycles or more per second, together with a source of a synchronizing voltage and means for connecting said source of synchroizing voltage to drive said multivibrator.

References Cited in the file of this patent

UNITED STATES PATENTS

| | | |
|---|---|---|
| 2,416,102 | Kessler et al. | Feb. 18, 1947 |
| 2,535,118 | Blashfield | Dec. 26, 1950 |
| 2,582,691 | Fritschi | Jan. 15, 1952 |
| 2,595,163 | Niederau | Apr. 29, 1952 |
| 2,601,403 | Lacy | June 24, 1952 |
| 2,679,551 | Newby | May 25, 1954 |